United States Patent [19]
Davis

[11] Patent Number: 6,054,702
[45] Date of Patent: Apr. 25, 2000

[54] LIGHT-INTENSITY REGULATING SYSTEM FOR A CENTRIPETAL OPPOSED PENDULOUS ACCELEROMETER ORIENTATION SENSOR

[75] Inventor: Stevens J. Davis, North Salt Lake City, Utah

[73] Assignee: Litton Systems Inc., Woodland Hills, Calif.

[21] Appl. No.: 09/124,145

[22] Filed: Jul. 28, 1998

[51] Int. Cl.$^7$ ........................................... G01J 1/32
[52] U.S. Cl. ...................... 250/205; 250/214 R
[58] Field of Search ................. 250/205, 208.1, 250/214 R, 214 P; 372/29, 38, 44, 8, 9

[56] References Cited

U.S. PATENT DOCUMENTS 5,665,958   9/1997   Rudd et al. .............................. 250/205

*Primary Examiner*—Que T. Le
*Attorney, Agent, or Firm*—Robert E. Malm

[57] ABSTRACT

The COPA accelerometer utilizes a sensing body having a non-zero product of inertia to sense acceleration when spun or oscillated about the y'-axis of an x'-y'-z' Cartesian coordinate system. The sensing body is pivotally attached to a platform and pivots about an axis parallel to the z-axis of an x-y-z coordinate system fixed in the sensing body, the z-axis being in the x'-z' plane. An orientation sensor provides a measure of the average angle between the y-axis and the y'-axis. The orientation sensor contains a laser diode which illuminates a plurality of regions of a photodetector thereby causing photodetector regional currents to flow out of the photodetector. The light intensity of the laser diode is regulated by (a) combining the photdetector regional currents and scaling the result to obtain a scaled total photodetector current, (b) generating a reference current, (c) generating a difference current measure, the difference current measure being monotonically related to the difference of the scaled total photodetector current and the reference current, (d) transforming the difference current measure into a control voltage, and (e) causing the current through the laser diode to vary monotonically with the control voltage.

15 Claims, 9 Drawing Sheets

LIGHT-INTENSITY REGULATING SYSTEM FOR A CENTRIPETAL OPPOSED PENDULOUS ACCELEROMETER ORIENTATION SENSOR

CROSS-REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

This invention relates generally to devices that measure the orientation of bodies and more specifically to devices that measure the orientation of rotating bodies that are used in measuring acceleration.

The accelerometers used in inertial navigation systems are typically of the pendulous torque-to-balance variety. A typical unit uses a hinged pendulum as the acceleration sensing body. An orientation sensor produces an error signal when the pendulum begins to pivot away from its desired null position as a result of an acceleration, and this error signal is used by a control circuit to maintain the pendulum in its null position by means of an electrical control signal applied to a torquing device. The magnitude of the electrical control signal is proportional to the acceleration and thus is a measure of the acceleration.

The centripetal opposed pendulous accelerometer (COPA) described herein offers a new approach to the design of precision accelerometers in that it utilizes a spinning body as the acceleration sensing element. The sensing element spins in a dry environment, and there are consequently no fluid migration/stratification/compatibility issues which might argue against a long operating life. No electrical connections to the sensing element are required, and the device is radiation hard.

The operation of a COPA entails measuring the tilt of the sensing element with an orientation sensor. The preferred orientation sensor is one which measures the tilt of the sensing element by the deflection of a beam of light reflected from a surface of the sensing element. A precise measurement of tilt can be achieved only if the intensity of the light is precisely regulated.

BRIEF SUMMARY OF THE INVENTION

A centripetal opposed pendulous accelerometer utilizes a sensing body which senses acceleration when rotated or oscillated about the y'-axis of an x'-y'-z' Cartesian coordinate system, the product of inertia $I_{xy}$ of the sensing body being greater than zero. The product of inertia is computed with respect to an x-y-z coordinate system fixed in the sensing body, the z-axis being in the x'-z' plane, the y and y' axes being aligned in the absence of acceleration.

The sensing body is pivotally attached to a platform, the sensing body pivoting about an axis parallel to the z-axis. A torquing device applies a torque about the z-axis to the sensing body sufficient to cause the average angle between the y-axis and the y'-axis to be zero in the absence of acceleration when the sensing body is being oscillated at a predetermined rate.

The accelerometer also includes an orientation sensor which provides a measure of the average angle between the y-axis and the y'-axis. A drive assembly rotates or oscillates the platform about the y'-axis. A control circuit receives the output of the orientation sensor and causes the drive assembly to rotate or oscillate the platform at a frequency and amplitude which causes the orientation angle to be near zero.

A key element of the orientation sensor is a laser diode which illuminates a plurality of regions of a photodetector thereby causing photodetector regional currents to flow out of the photodetector. The invention is a method and apparatus for regulating the light intensity of the laser diode The method comprises the steps of (a) combining the photdetector regional currents and scaling the result to obtain a scaled total photodetector current, (b) generating a reference current, (c) generating a difference current measure, the difference current measure being monotonically related to the difference of the scaled total photodetector current and the reference current, (d) transforming the difference current measure into a control voltage, and (e) causing the current through the laser diode to vary monotonically with the control voltage.

DETAILED DESCRIPTION OF THE INVENTION

Figure 1:
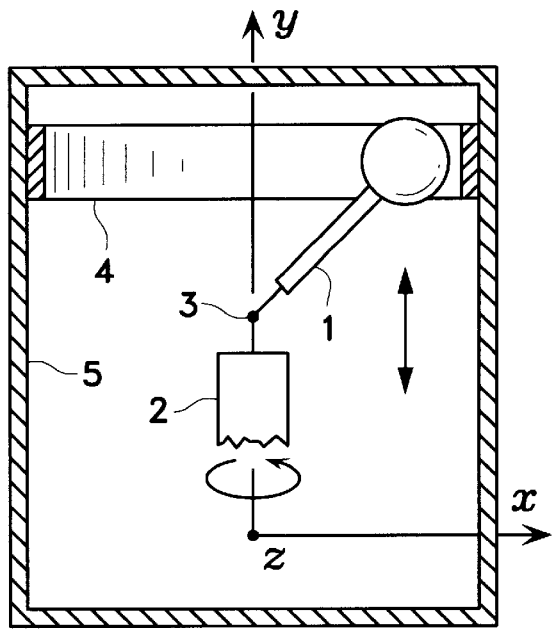
FIG. 1 illustrates the principle of operation of a centripetal opposed pendulous accelerometer utilizing a single sensing body.

The principle of operation of the centripetal opposed pendulous accelerometer (COPA) is illustrated in FIG. 1.

The sensing body 1 is attached to the platform 2 by the flexure 3. The x-y-z Cartesian coordinate system shown in the figure (z axis out of the paper) is fixed with respect to the sensing body 1. The flexure 3 constrains the movement of the sensing body 1 to the x-y plane. In the absence of any acceleration, the platform 2 is spun at a rate $\Omega_0$ which causes the sensing body 1 to assume the position shown in the figure, the force applied by the flexure 3 just balancing the centrifugal force on the sensing unit as a result of the spinning about the y-axis. If there is now an acceleration in either of the directions indicated by the two-headed arrow, the sensing body 1 will attempt to rotate about the z-axis in the direction of the acceleration. A change in position of the sensing body 1 in the x-y-z coordinate system is detected by the change in capacitance between the sensing body 1 and a conducting ring 4 attached to the support structure (or case) 5 of the accelerometer. A control circuit, not shown, causes the spin rate to either increase or decrease to keep the capacitance the same and the position of the sensing body 1 unchanged. The change in spin rate is nearly proportional to the acceleration.

The equation of motion for the sensing body is $$I_{zz}\alpha + C\omega + [K + (I_{yy} - I_{xx})\Omega^2]\theta = mra - I_{xy}\Omega^2 + T_B \qquad (1)$$

The angle $\theta$ defines the orientation of the sensing body and the x-y-z coordinate system with respect to the x'-y'-z' coordinate system fixed with respect to the support structure 5. The y-axis coincides with the y-axis when the sensing body 1 is in its null position as shown in the figure. The angle $\theta$ is the angle between the y axis and the y'-axis (when the sensing body is not in its null position). The time rate of change of $\theta$ is denoted by $\omega$ and the time rate of change of $\omega$ is denoted by $\alpha$. The damping coefficient is denoted by C, and the spring coefficient of the flexure is denoted by K. The moments and products of inertia of the sensing body 1 are denoted by I with appropriate subscripts. The spin rate of the sensing body 1 is denoted by $\Omega = \Omega_0 + \Delta\Omega$. The symbol m stands for the mass of the sensing body 1, r is the distance of the center of mass of the sensing body 1 from the y-z plane, and a is the acceleration. The symbol $T_B$ represents any additional torque exerted on the sensing body 1.

Under steady-state conditions $\alpha$, $\omega$, and $\theta$ are all equal to zero, and $$\alpha = (I_{xy}/P)\Omega_0^2[2(\Delta\Omega/\Omega_0) + (\Delta\Omega/\Omega_0^2)] \qquad (2)$$

where P, the pendulosity, is the product of m and r. Note first that a is very nearly a linear function of $\Delta\Omega$ since $\Delta\Omega$ is small compared to $\Omega_0$. Second, note that this technique for measuring acceleration requires that the sensing body have a non-zero $I_{xy}$.

Figure 2:
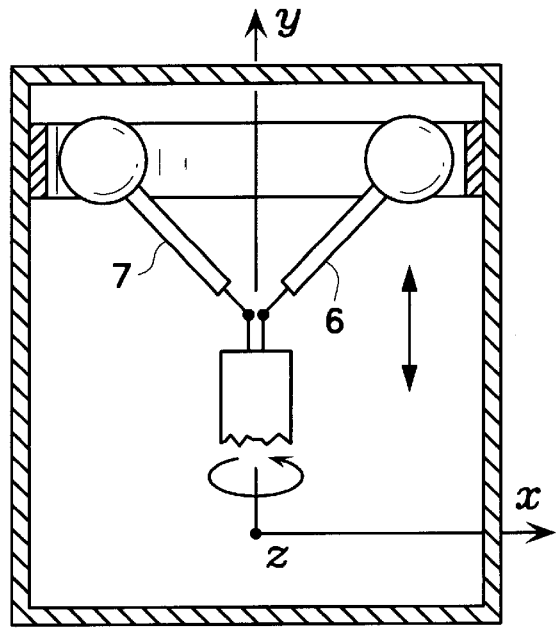
FIG. 2 illustrates the principle of operation of a centripetal opposed pendulous accelerometer utilizing two sensing bodies.

The configuration shown in FIG. 2 provides both a statically- and dynamically-balanced load for the drive assembly. Two sensing bodies 6 and 7 are used, each with its own flexure. The configuration of FIG. 2 can be expanded by adding more sensing bodies, each sensing body having its own flexure, until the sensing bodies form a cone.

Figure 3:
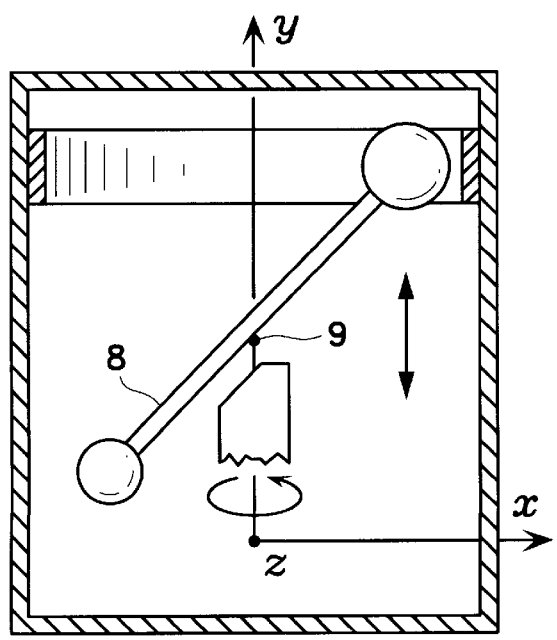
FIG. 3 illustrates a sensing body having mass distributed in both the first and second quadrants of a Cartesian coordinate system and a pivot point on the axis of rotation.

A somewhat different configuration is shown in FIG. 3. Here, the mass of the sensing body 8 is distributed on both sides of the flexure 9. All of the mass additively contributes to the magnitude of $I_{xy}$. However, the distribution of mass in the two x-y quadrants must be such as to give a center of mass offset in the x-direction from the flexure 9. This configuration has the same disadvantage as the configuration of FIG. 1 in that the sensing body is a statically unbalanced load as far as the driving assembly is concerned.

Figure 4:
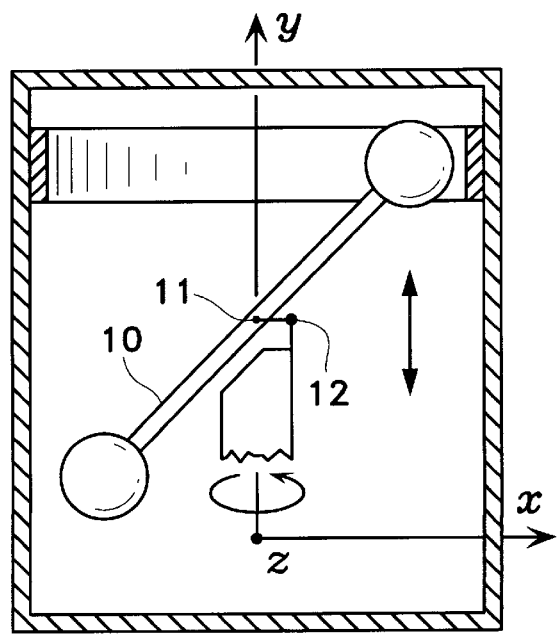
FIG. 4 shows a sensing body having mass distributed in both the first and second quadrants of a Cartesian coordinate system and a pivot point offset from the axis of rotation.

In the configuration of FIG. 4, the sensing body 10 is a statically balanced load as far as the driving assembly is concerned in that the center of mass 11 is on the axis of rotation. Even with the center of mass on the axis of rotation, the sensing body 10 is still able to sense acceleration because the pivot point of the flexure 12 is displaced from the axis of rotation.

Figure 5:
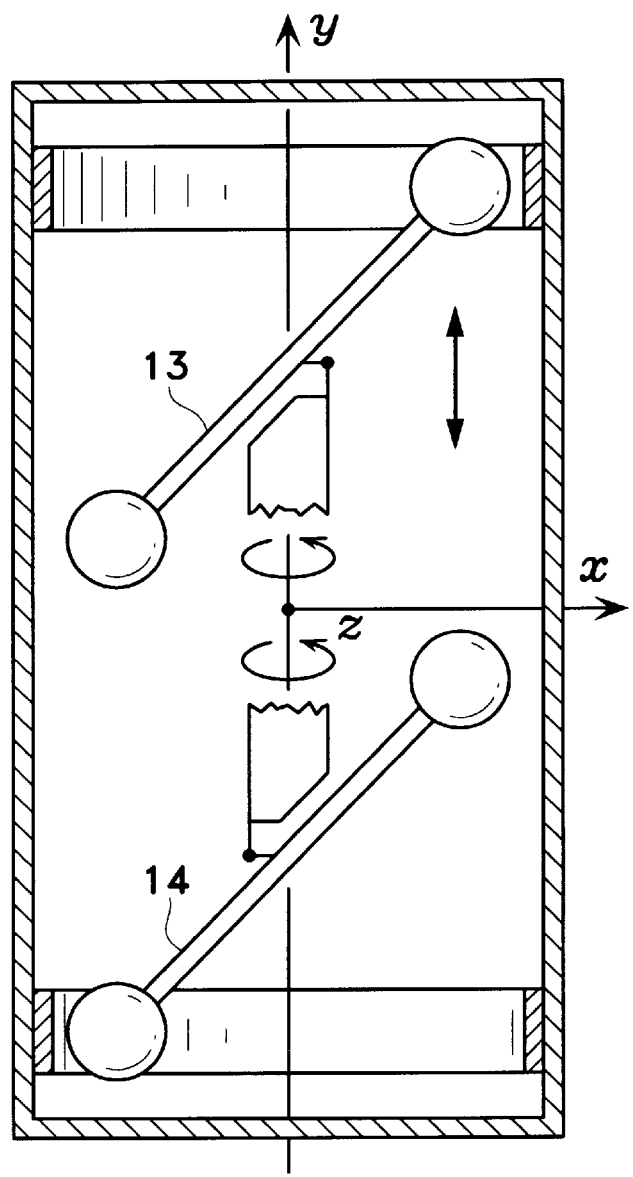
FIG. 5 shows two independently operating sensing bodies which pivot in opposite directions as a result of an acceleration.

In the configuration of FIG. 5, sensing bodies 13 and 14, which are like sensing body 10 in FIG. 4, are mounted such that they pivot in opposite directions as a result of an acceleration. Assuming a positive acceleration, sensing body 13 would have to be rotated at a rate of $\Omega_1 = \Omega_0 + \Delta\Omega_1$ and sensing body 14 at a rate of $\Omega_2 = \Omega_0 + \Delta\Omega_2$, where $\Delta\Omega_1$ is positive and $\Delta\Omega_2$ is negative if the orientations shown in FIG. 5 were to be maintained. The rate $\Omega_0$ is the rate required to maintain both sensing bodies 13 and 14 in the FIG. 5 orientations in the absence of an acceleration and assuming sensing bodies 13 and 14 have the same product of inertia $I_{xy}$.

The acceleration under these circumstances is given by $$a = \frac{2I_{xy}\Omega_0}{P_1 + P_2}\left(1 + \frac{\Delta\Omega_1 + \Delta\Omega_2}{2\Omega_0}\right)(\Omega_1 - \Omega_2) \qquad (3)$$

where $P_1$ and $P_2$ are the pendulosities of sensing bodies 13 and 14 respectively. If the difference in magnitudes of $\Delta\Omega_1$ and $\Delta\Omega_2$ is small and $\Omega_0$ is large, the above equation approaches $$a = \frac{2I_{xy}\Omega_0}{P_1 + P_2}(\Omega_1 - \Omega_2) \qquad (4)$$

which is a linear relationship. In reality, this relationship will never be reached, but the double-ended instrument of FIG. 5 will be more linear than the single-ended instrument of FIG. 4 as can be seen from a comparison of equations (2) and (3).

It should be noted that the embodiments shown in FIGS. 4 and 5 are statically balanced with respect to accelerations normal to the y-axis and are thus insensitive to such accelerations.

Figure 6:
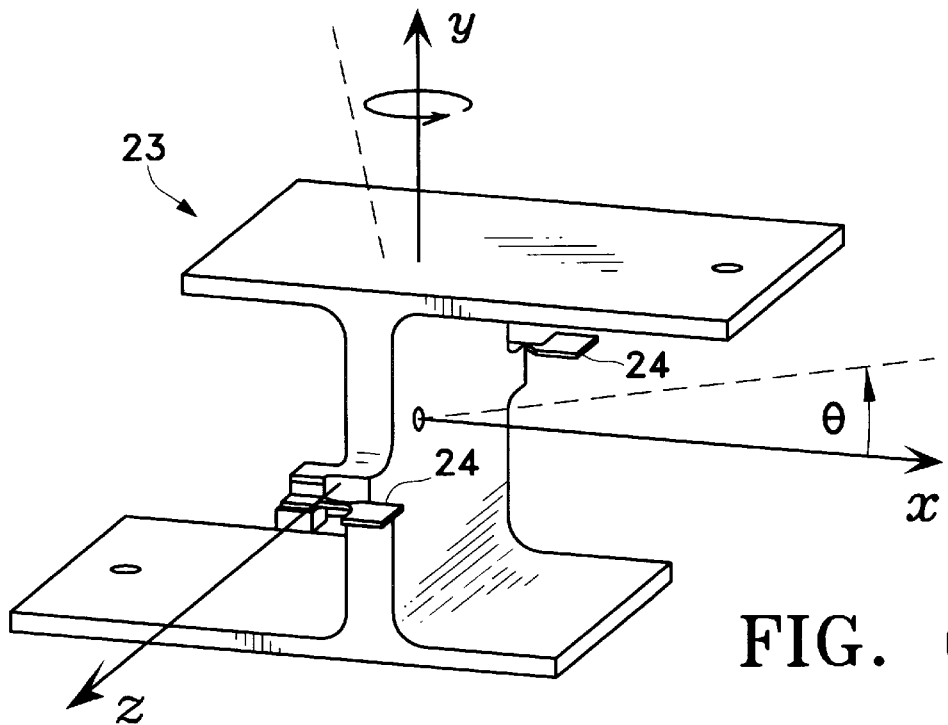
FIG. 6 shows the preferred embodiment of the sensing body for the centripetal opposed pendulous accelerometer.

The preferred embodiment of the sensing body 23 with attached flexures 24 is shown in FIG. 6. The properties are as follows:

| | | |
|---|---|---|
| $I_{xx}$ = 0.109 g · cm | m = 0.494 g | C = 30 $\mu$N · cm/(rad · s) |
| $I_{yy}$ = 0.109 g · cm | P = 0.013 g · cm | K = 1.15 mN · cm/rad |
| $I_{zz}$ = 0.143 g · cm | $\Delta\Omega$ = 2 rad/(s · gravity unit) | $T_B$ = 3.32 mN · cm |
| $I_{xy}$ = 0.032 g · cm | $\Omega_\alpha$ = 100 rad/s | |

The center of mass of the sensing body 23 lies on the y-axis. The sensing body 23 is pivotally mounted on a platform by means of the flexures 24 so as to be free to rotate through small angles about an axis parallel to the z-axis. The sensing body-platform assembly is spun about a y'-axis fixed with respect to the platform, the y'-axis coinciding with the y-axis in the absence of acceleration. The sensing body 23 is machined from beryllium.

Figure 7:
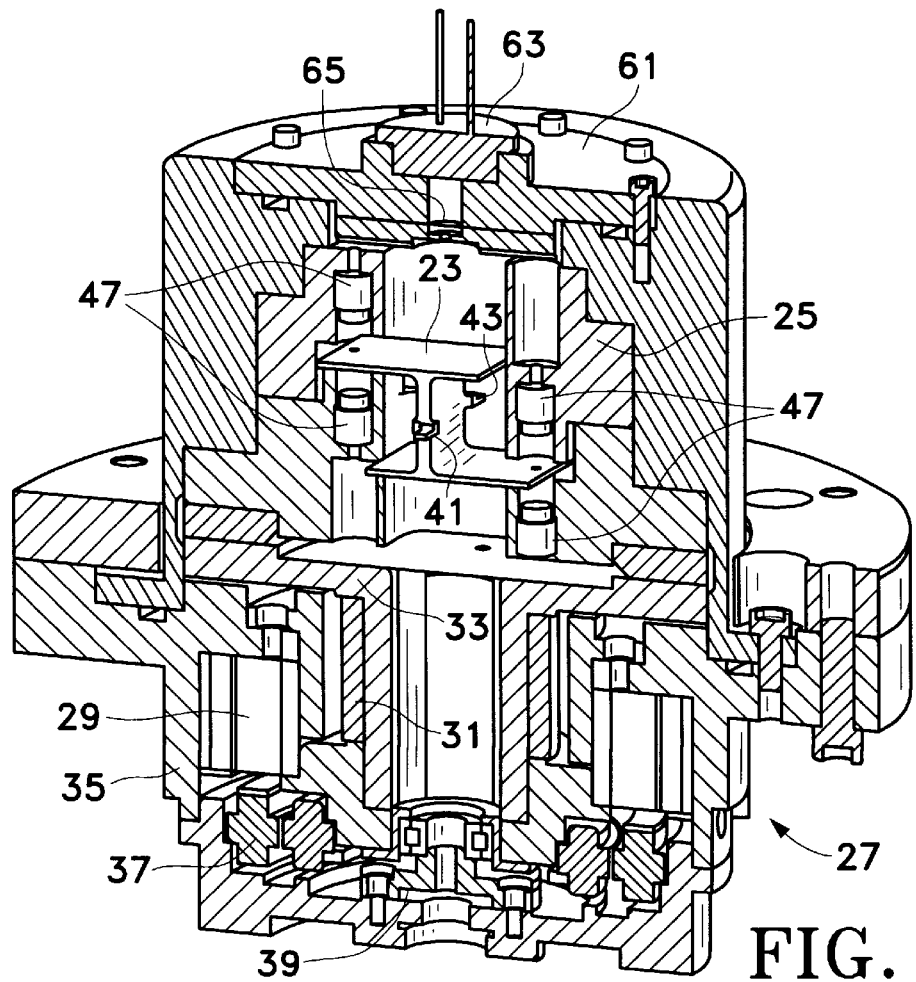
FIG. 7 shows a cut-away view of the preferred embodiment of a centripetal opposed pendulous accelerometer.

An embodiment of the COPA accelerometer is shown in FIG. 7. The sensing body 23 of FIG. 6 is shown attached to the platform 25. The platform 25 is mounted to the drive assembly 27 consisting of a brushless servomotor 29, precision ball bearings 31, and drive shaft 33. The drive assembly 27 is attached to the support structure 35. The rotation sensor 37 is a high-accuracy absolute angle resolver which provides servomotor commutation, demodulates the angular pickoff output, and provides a sine/cosine angle readout waveform. The rotary transformer 39 powers the resolver primary.

Figure 8:
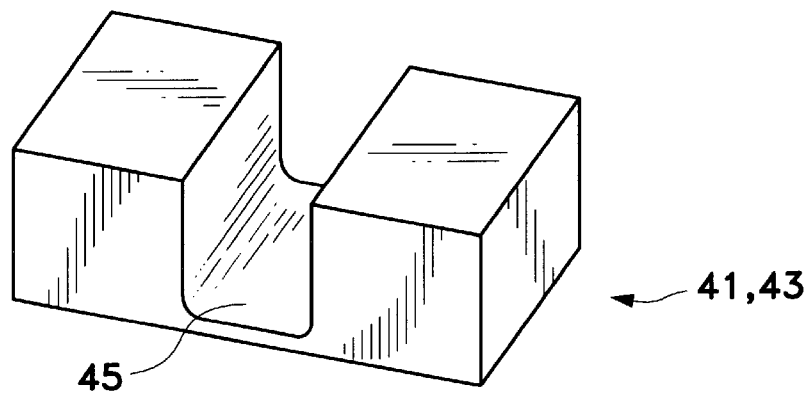
FIG. 8 shows the flexures which support the sensing body of FIG. 7 on the platform.

The sensing body 23 is attached to the platform 25 by two flexures 41 and 43. The flexure design is shown in FIG. 8. The flexures 41, 43 are 190 $\mu$m long by 150 $\mu$m wide by 127 $\mu$m thick and are made of ELIGILOY®. The hinge portion 45 is 64 $\mu$m long by 5 $\mu$m thick. The properties of the flexures are as follows:

| | |
|---|---|
| $K_{torshional}$ = 1.13 mN · cm/rad | $\sigma_{bending}$ = 8 MPa/mrad |
| $f_{n\text{-torsional}}$ = 5 Hz | $\sigma_{tensile}$ = 296 MPa/N |
| $K_{translational}$ = 13 $\mu$m/N | $P_{critical}$ (buckling) = 7.35 N |
| $f_{n\text{-translational}}$ = 1340 Hz | |

The angular freedom of a flexure is ±10 mrad.

Figure 9:
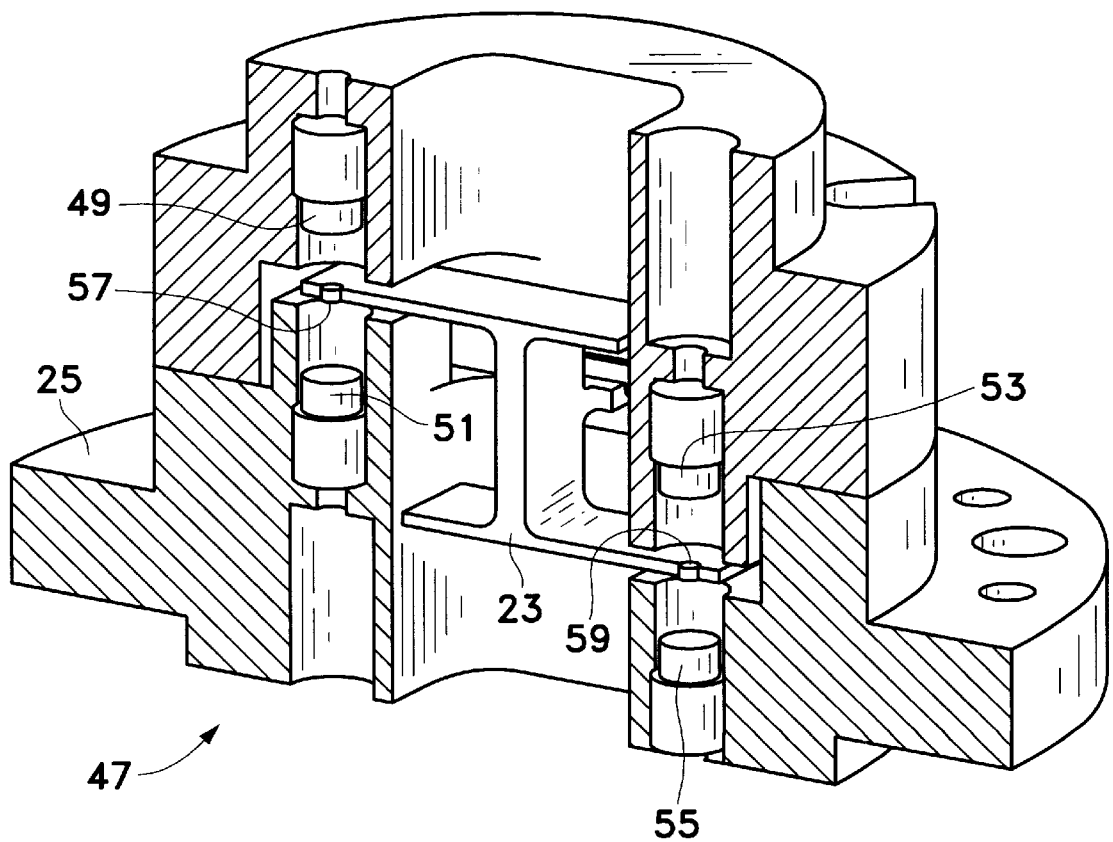
FIG. 9 shows a cut-away view of the sensing body/platform assembly which reveals the details of the torquing device.

The torquing device 47 provides the torque necessary to maintain the sensing body 23 in its null position while being spun at its zero-acceleration spin rate. The torquing device 47, shown in greater detail in FIG. 9 consists of four permanent magnets 49, 51, 53, and 55 installed on the platform 25 and two permanent magnets 57 and 59 installed in the sensing body 23. The south pole of magnet 57 is adjacent to the north pole of magnet 49, the north pole of magnet 57 is adjacent to the north pole of magnet 51, the north pole of magnet 59 is adjacent to the north pole of magnet 53, and the south pole of magnet 59 is adjacent to the north pole of magnet 55. This arrangement torques the sensing body 23 in a clockwise direction in opposition to the torque on the sensing body 23 that results from spinning the sensing body about the vertical axis. The magnets are made of samarium cobalt, are temperature compensated, and have an energy product of 72,000 T·A/m. The torque exerted by the torquing device 47 is very nearly constant at 33.2 $\mu$N·m for rotations of the sensing body 23 over a range of 20 mrad.

Figure 10:
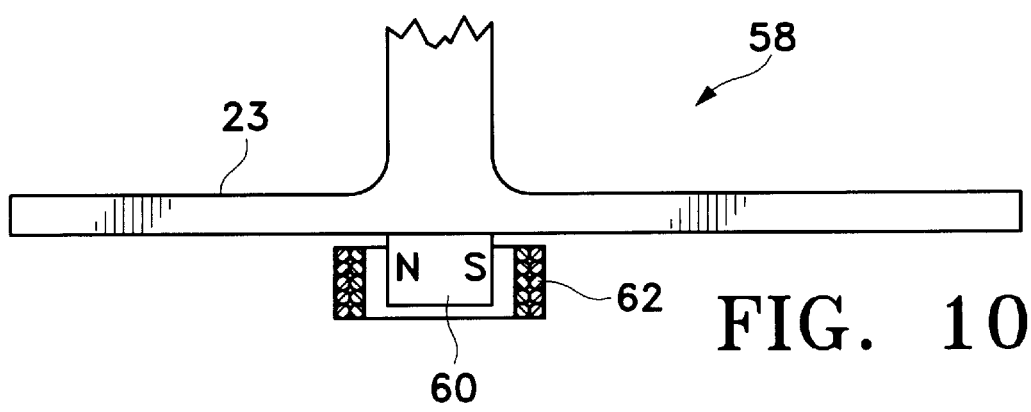
FIG. 10 shows an alternative torquing device.

An alterative torquing device 58 is shown in FIG. 10. A single permanent magnet 60 is mounted to the sensing element 23. A coil 62 attached to the platform 25 encircles the permanent magnet 60. Current in the coil creates a magnetic field normal to the north-south axis of the permanent magnet 60. The north-south axis attempts to align itself with the magnetic field thereby causing a torque normal to the drawing to be applied to the sensing body 23. The direction of the torque is controllable by the direction of the current in the coil, and the magnitude of the torque is controllable by the magnitude of the current.

Figure 11:
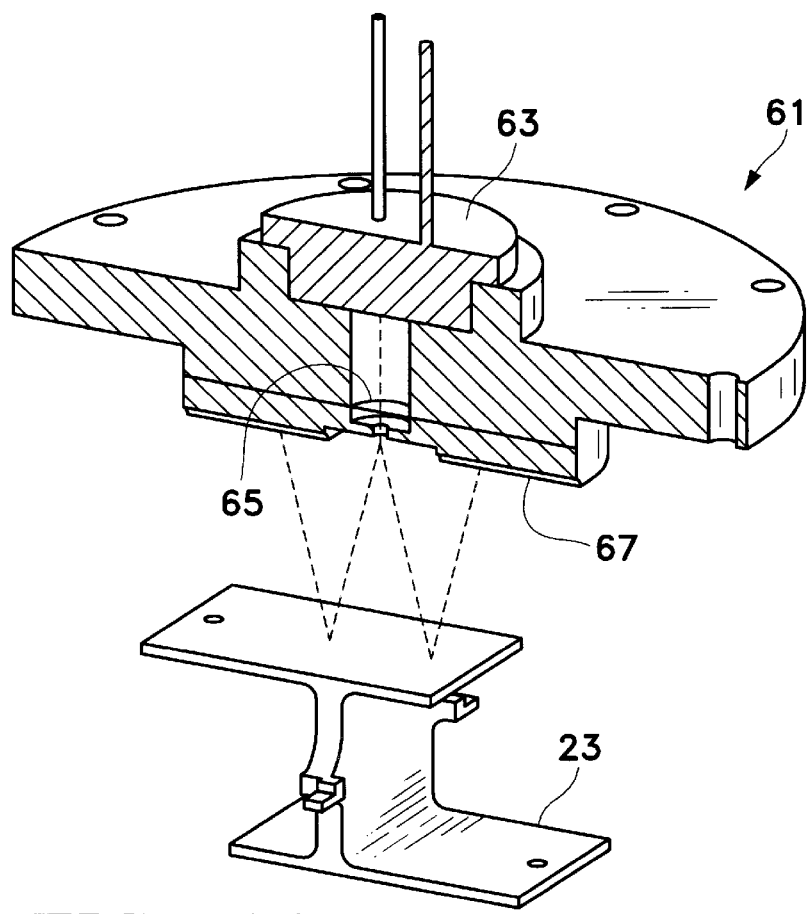
FIG. 11 shows the details of the orientation sensor.

The orientation of the sensing body relative to the platform is measured by the orientation sensor 61 (FIG. 7). The orientation sensor 61 is shown in more detail in FIG. 11. A super luminescent diode (SLD) 63 emits light rays which are collimated by the lens 65, reflected by the surface of the sensing body and detected by the PIN diode 67. When the sensing body 23 is in its null position, the light received in the four quadrants of the PIN diode 67 will be balanced. When the sensing body 23 departs from its null position, the light received in the four quadrants will be unbalanced. By appropriate processing of the electrical signals from the four quadrants, an error signal can be obtained which is a measure of the tilt angle of the sensing body 23.

The SLD produces light at a wavelength of 960 nm with a spectral bandwidth of 20 nm and a beam ellipticity of 1.7 to 1. The power output is 3 mW and the coherence length is 400 $\mu$m.

The position-sensing PIN photodiode is a standard 2.5-cm diameter quad cell customized with a center hole. The part is available from UDT Sensors Inc. The noise equivalent power of the part is 0.1 pW/√Hz, angle noise is 0.03 $\mu$rad/√Hz, and the scale factor is 2.7 mA/rad.

Figure 15:
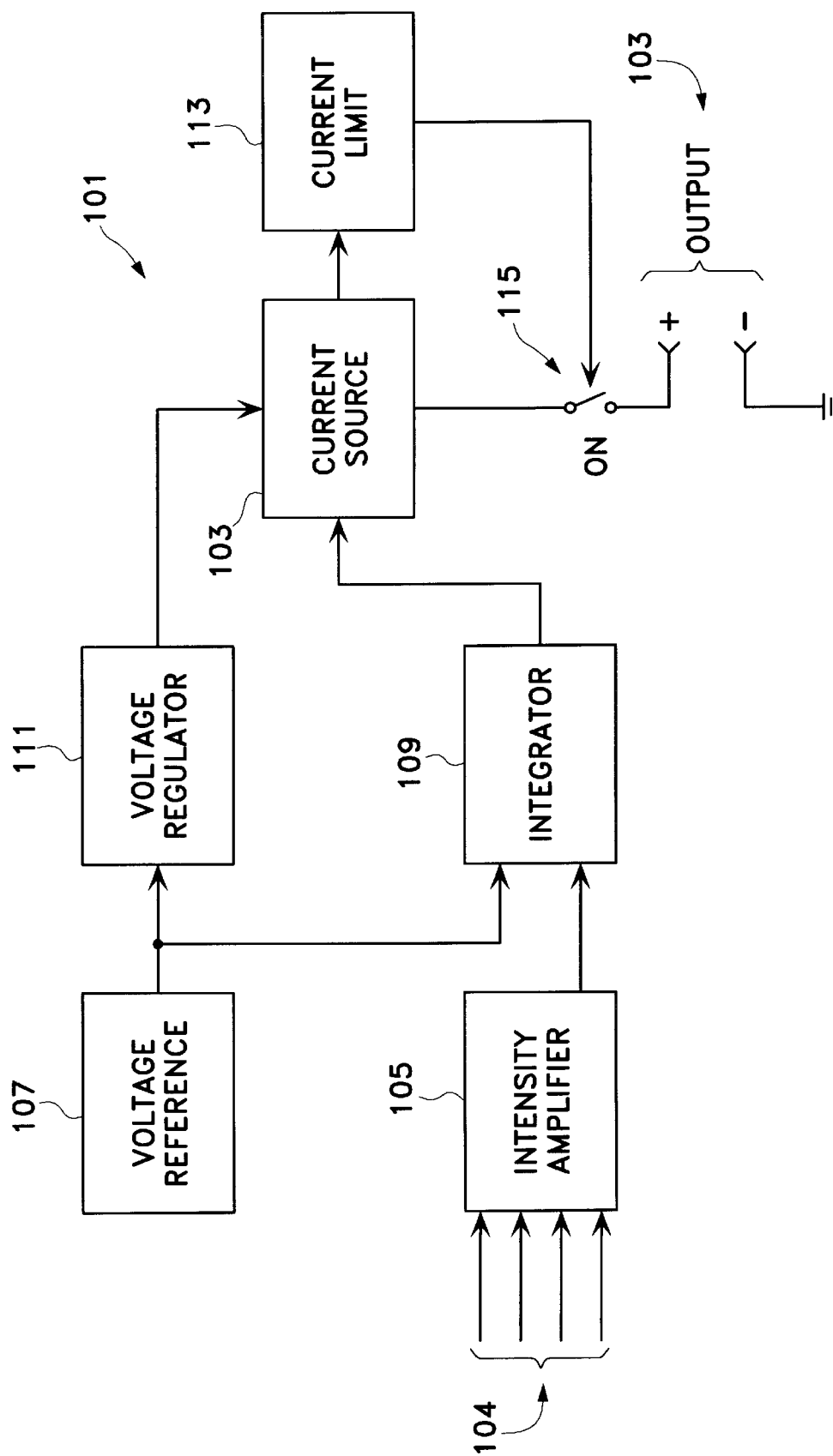
FIG. 15 shows a block diagram of the light-intensity regulating system for the orientation sensor.

The most significant parameters that affect the intensity of light produced by the SLD 53 are current and temperature. To avoid variations in light intensity the SLD is driven by the light-intensity regulating system 101 shown in FIG. 15 which adjusts the current flowing through the output ports 103 to the SLD to maintain a constant light intensity.

A measure of the light intensity can be obtained by combining the currents from the four quadrants of PIN diode 67. Since substantially all of the light emitted by the SLD is captured by the four quadrants, the combined current from the four quadrants is a measure of the light intensity. Although the use of a four-quadrant photodetector is preferred for the centripetal opposed penulous accelerometer, other applications may dictate that the light-sensitive region of a photodetector be subdivided in other ways. The light-intensity regulating system 101 will work satisfactorily with other photodetector regional configurations if the sum of the photodetector regional subdivisions are a measure of the SLD light intensity.

The photodetector quadrant currents 104 feed into the intensity amplifier 105 which combines the currents and outputs a scaled total photodetector current. This scaled total photodetector current is compared with a reference current supplied by voltage reference 107 in integrator 109 which produces a control voltage at its output which represents the integration of the difference between the scaled total photodetector current and the reference current.

The SLD current is obtained from voltage regulator 111. The control voltage produced by integrator 109 controls the flow of current from voltage regulator 111 through current source 103. When the light intensity decreases/increases, the control voltage causes the current through the SLD to increase/decrease thereby maintaining the light intensity at a constant level.

The current flowing through the SLD is monitored by the current limit circuit 113. If the current exceeds a predetermined threshold, switch 115 opens thereby interrupting the current flow through the SLD.

Figure 16:
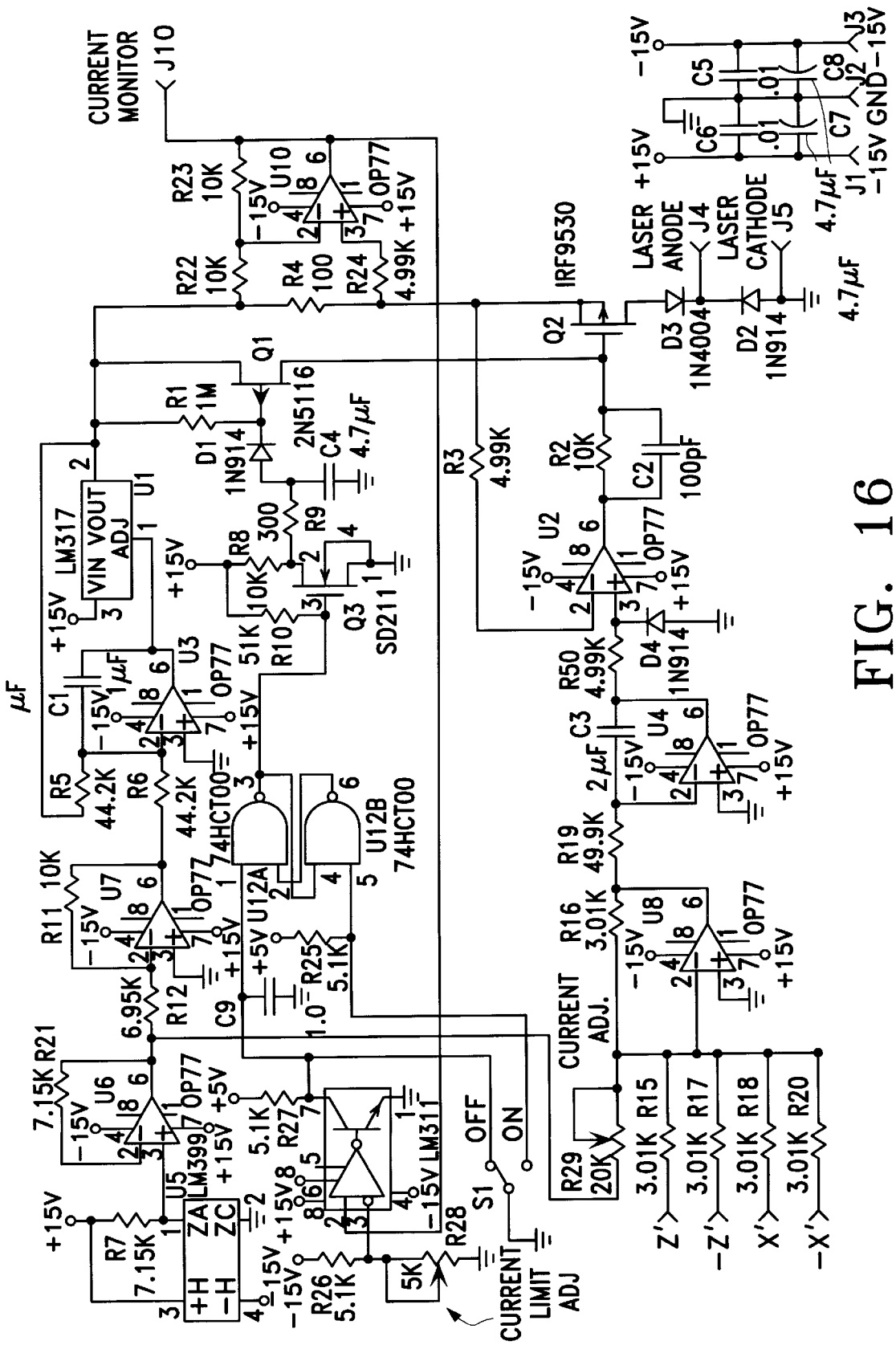
FIG. 16 shows a circuit diagram of the light intensity regulating system for the orientation sensor.

The light-intensity regulating system 101 is shown in more detail in FIG. 16. When switch S1 is in the off position, pin 1 of U12A (type 74HCT00) is low and pin 3 is high. As a result, DMOS Q3 (type DMOS N) is turned on thereby turning on JFET Q1 (type 2N5116), turning off MOSFET Q2 (type IRF9530), and preventing current from flowing through the SLD.

When switch S1 is switched to the on position, JFET Q3 is turned off and the time constant asssociated with resistors R8 (10 k$\Omega$) and R9 (150 $\Omega$) and capacitor C4 (4.7 $\mu$F) prevent turn-on transients by slowly turning JFET Q1 off. The turn-off period for JFET Q1 should be at least 100 microseconds. Operational amplifier U2, voltage regulator U1, MOSFET Q2, and resistor R4 comprise a precision voltage-controlled current source. Operational amplifier U2 turns on Q2 and causes the source current of Q2 to increase until the voltage at pin 2 of U2 equals the control voltage at pin 3.

Voltage reference U5 (type LM399) and operational amplifier U6 (type OP77) provide a reference for voltage regulator U1 (LM317) via operational amplifiers U7 (type OP77) and U3 (type OP77). They also provide a stable refernce for summing amplifier U4 (type OP77).

The four quadrants of the PIN diode 67 (see FIG. 11) are denoted in sequence as the +z', +x', −z', and −x' quadrants. The quadrants surround the origin of the z'-x' coordinate frame of reference with the +z', +x', −z', and −x' quadrants being centered on the corresponding plus and minus semi-axes. The x'-y'-z' coordinate axes are fixed with respect to the COPA, the sensing body 23 being spun about the y' axis.

The +z' quadrant and the −z' quadrant signals are summed at pin 2 of operational amplifier U8 (type OP77) and the +x' quadrant and the −x' quadrant signals are summed at pin 2 of operational amplifier U9 (type OP77). Since the AC signal components of the +z' quadrant and the −z' quadrant signals and the AC signal components of the +x' quadrant and the −x' quadrant signals that result from the spinning of the sensing body are 180 degrees out of phase, they cancel each other out leaving only the DC components.

When the sensing body 23 is in its null position, the currents through resistors R13 (10 kΩ) and R14 (10 kΩ) equal the current through SLD current adjustment potentiometer R29 (0–20 kΩ), and operational amplifier U4 (type OP77) provides a stable control voltage at pin 3 of U2 and hence a constant current through the SLD. With increasing temperature, the quadrant signals decrease in amplitude. Since the current through R13 and R14 no longer equals that through R29, the output of U4 decreases causing the voltage at pin 3 of U2 to further turn on Q2, thereby increasing the current through the SLD and the quadrant currents. When the outputs of U8 and U9 increase the currents through R13 and R14 sufficiently to balance the current through R29, the output of U4 provides a stable control voltage at pin 3 of U2 and a constant current through the SLD.

The output of operational amplifier U10 (type OP77) provides an SLD current monitor test point and an input to compartor U11 (type LM311). When the input of the comparator at pin 2 is greater than that at pin 3, set by the over-current limit potentiometer R28, the output of comparator U11 sets the latch at U12 pin 3 thereby turning on JFETs Q3 and Q1 and turning off the constant current source.

When current through the SLD is interrupted by moving the switch S1 to the off position, an over-current condition, or a loss of power, diodes D3 and D2 prevent a reverse transient from passing throught the SLD.

Figure 12:
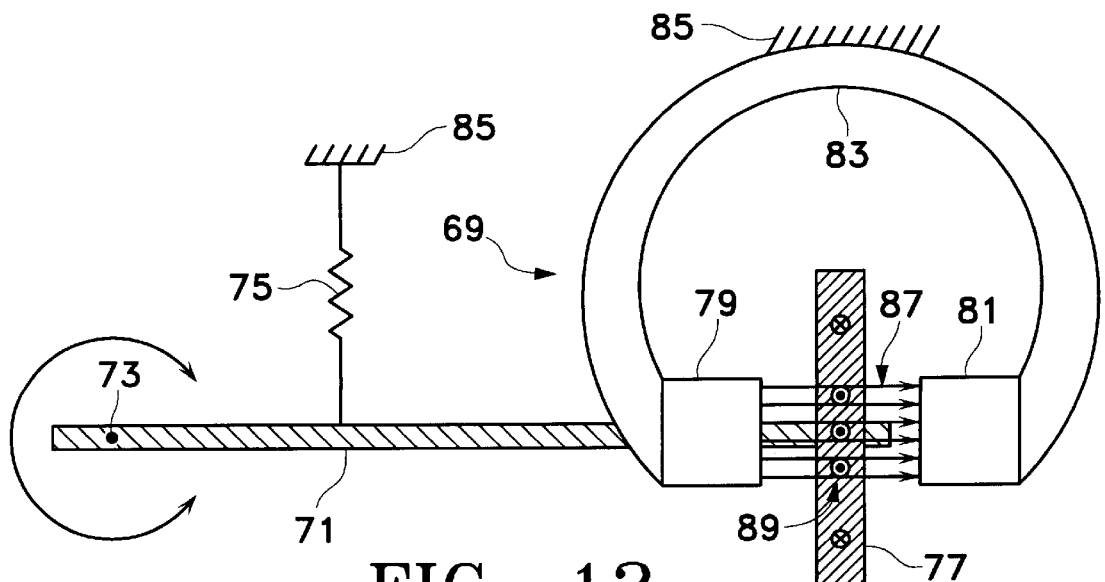
FIG. 12 illustrates the operation of the damping apparatus which damps oscillations of the sensing body.

In order to prevent the sensing body from hitting pivot-angle limit stops during vibratory accelerations, the sensing body should be damped. The eddy current damper 69 shown in FIG. 12 is one approach to providing damping. The sensing body 23 is symbolically represented by the member 71 which pivots about axis 73. The flexures 41, 43 are symbolically represented by the spring 75. The platform 25 is symbolically represented by the diagonal lines 85.

The eddy current damper consists of a copper sheet 77 approximately 0.4 cm square and 0.025 cm thick attached to the sensing body 23 and positioned between magnets 79 and 81 which are attached to the low-reluctance return path 83 which in turn is attached to the platform 25, symbolically represented by the diagonal lines 85. As the copper sheet 77 pivots with the sensing body 71 about the axis 73, the copper sheet moves through the magnetic field lines 87 resulting in the generation of eddy currents 89. Interaction of the eddy currents 89 with the magnetic field lines 87 results in a force on the copper sheet 77 proportional to the velocity of the sheet and in the opposite direction. The damping constant C is equal to the ratio of the eddy-current torque to the angular rate of the copper sheet and is given by the equation $$C = (B^2 R^2 A t)/\rho \qquad (5)$$

where B is the magnetic flux density, R is the distance of the copper sheet 77 from the pivot axis 73, A is the pole area of the magnets 79, 81, t is the thickness of the copper sheet 77, and ρ is the resistivity of copper. A value for C of $4.0 \times 10^{-7}$ N·m is obtained for the following parameter values: B=0.6733 T, R=0.762 cm, A=0.031 cm², t=0.025 cm, and ρ=5.05×10⁻⁸ Ω·m.

Figure 13:
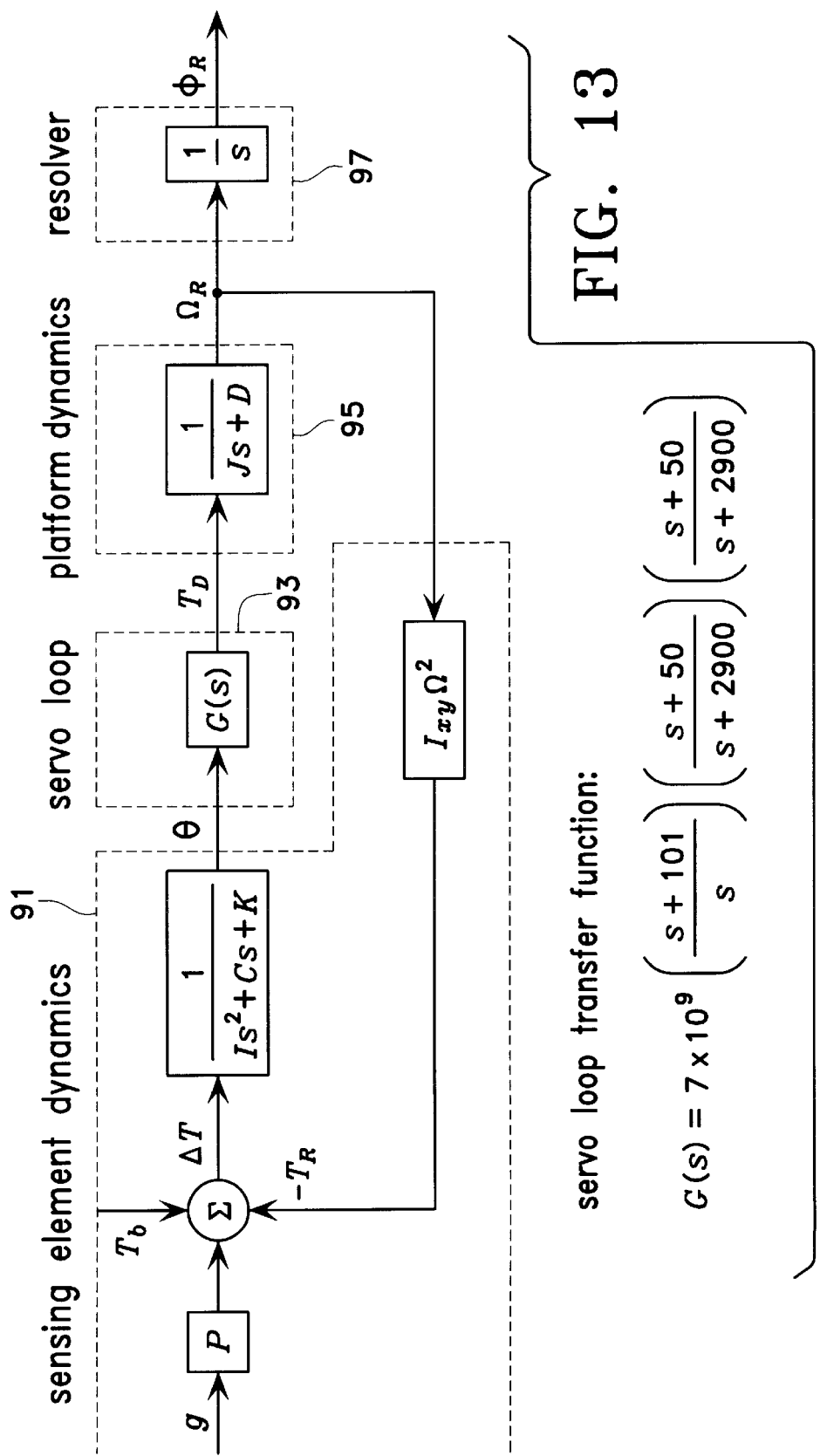
FIG. 13 shows a block diagram that mathematically defines the dynamics of the centripetal opposed pendulous accelerometer with a rotating sensing body.

The dynamics of COPA are mathematically defined by the block diagram shown in FIG. 13. The sensing body dynamics are defined in block 91. The symbol I denotes the same quantity as $I_{zz}$ did in FIG. 1. The servo loop transfer function indicated in block 93 is defined by the equation at the bottom of the figure. The platform dynamics are defined in block 95. The symbol J is the moment of inertia of the platform with respect to the spin axis. The symbol D is the damping coefficient for the platform. The values of J and D are 100 g·cm² and 4 mN·cm·s respectively. The resolver 97 provides a measure of the angle of rotation of the platform 25.

Rather than cause the sensing body 1 to be driven unidirectionally about the y'-axis, the sensing bodies 1, 6, 7, 8, 10, 13, and 14 can be caused to oscillate about the y-axis. Then the spin rate Ω would be time varying and could, for example, be of the form $$\Omega = \Omega_A \sin{(\omega_m t)} \qquad (6)$$

where $\Omega_A$ is the amplitude of the rate oscillation and $\omega_m$ is the angular oscillation frequency. It should be noted that $\Omega_A$ is the product of the angular oscillation amplitude and the angular oscillation frequency. Consequently, $\Omega_A$ can be varied either by varying angular oscillation amplitude (angle mode operation) or the angular oscillation frequency (frequency mode operation).

Although the operation of the COPA is described herein in terms of a sinusoidal oscillation, the oscillation should be thought of more generally as being characterized by simply a periodic function.

Substituting for Ω in equation (1), we obtain $$I_{zz}\alpha + C\omega + K\theta = mra - I_{xy}\Omega_A^2 \sin^2{(\omega_m t)} + T_B \qquad (7)$$

Generally, the instrument servo seeks to drive the sensing body angle θ and its time derivatives to zero. Under these circumstances, $$\Omega_A^2 = \frac{T_B - mra}{I_{xy}\sin^2(\omega_m t)} \qquad (8)$$

Since $\sin^2{(\omega_m t)}$ is zero some of the time, maintaining θ and its time derivatives at zero would require $(\Omega_A)^2$ to be infinite some of the time. Thus, it is unreasonable to expect the servo to maintain the sensing body at a zero angle of deflection. Rather, it will dither about some mean value at the same frequency as the platform.

However, the servo will be able to drive the mean value of θ to zero. Averaging both sides of equation (8) over a time long compared with $1/\omega_m$ and short compared with the time it takes for significant variations in α to occur, we obtain $$\Omega_A^2 = \frac{2(T_B + mra)}{I_{xy}} \qquad (9)$$

where we have replaced $\sin^2{(\omega_m t)}$ by its average value ½.

The instrument scale factor SF can be defined as $$SF \equiv \frac{2mr}{I_{xy}} \qquad (10)$$

At zero acceleration, the bias torque $T_B$ is balanced by a bias platform rate $\Omega_0$. Solving equation (9) for $T_B$ under these circumstances yields the equation $$T_B = \frac{I_{xy}\Omega_0^2}{2} \quad (11)$$

Finally, making use of the above scale factor and bias platform rate, we rearrange equation (9) to obtain an expression for acceleration:

$$a = \frac{1}{SF}(\Omega_A^2 - \Omega_0^2) \quad (12)$$

We now consider implementing a control law in the form $$\Omega = \left(\Omega_0^2 + K_P\theta + K_I \int \theta dt\right)^{\frac{1}{2}} \sin(\omega_m t) \quad (13)$$

where $K_P$ and $K_I$ are constants chosen to provide the desired closed-loop response. This equation basically describes the well-known proportional-integral controller with an offset. Substituting for $\Omega$ in equation (1), we obtain $$I_{zz}\alpha + C\omega + [K + I_{xy}K_P \sin^2(\omega_m t)]\theta + I_{xy}K_I \sin^2(\omega_m t)\int\theta dt = mra - I_{xy}\Omega_0^2 \sin^2(\omega_m t) + T_B \quad (14)$$

If $\omega_m$ is made large compared to the highest frequency likely to be experienced in $\alpha$, then we may replace the terms in the above equation by their average values over an oscillatory cycle. We represent $\theta$ by a Fourier series in $\omega_m t$ and include in the above equation only the first term $\theta_a$ and the time derivatives of the first term $\omega_a$ and $\alpha_a$.

$$I_{zz}\alpha_a + C\omega_a + \left(K + \frac{I_{xy}K_P}{2}\right)\theta_a + \frac{I_{xy}K_I}{2}\int\theta_a dt = mra - \frac{I_{xy}\Omega_0^2}{2} + T_B \quad (15)$$

which represents a linear system. Choosing the bias torque $T_B$ and the bias platform rate $\Omega_0$ such that the terms which contain the two quantities cancel each other, we obtain $$I_{zz}\alpha_a + C\omega_a + \left(K + \frac{I_{xy}K_P}{2}\right)\theta_a + \frac{I_{xy}K_I}{2}\int\theta_a dt = mra \quad (16)$$

Since this system is linear and time-invariant, all of the well-known compensator design techniques can be used to arrive at the desired closed-loop response for the system. Furthermore, the behavior of this system will approximate the behavior of the oscillating system, especially if the oscillation frequency is large.

Typical values for the parameters are as follows:

| | |
|---|---|
| sensing body moment of inertia ($I_{zz}$) | $1.440 \times 10^{-8}$ kg · m² |
| sensing body damping coefficient (C) | $4.000 \times 10^{-3}$ N · s/m |
| flexure spring constant (K) | $1.000 \times 10^{-5}$ N · m/rad |
| pendulosity (P) | $1.300 \times 10^{-7}$ kg · m |
| sensing element product of inertia ($I_{xy}$) | $3.320 \times 10^{-9}$ kg · m² |
| zero-acceleration oscillation rate ($\Omega_0$) | $1.410 \times 10^2$ rad/s |
| scale factor (SF) | $7.830 \times 10^1$ rad²/m |
| instrument bias ($\Omega_0^2$/SF) | $2.539 \times 10^2$ m/s² |
| sensing body scale factor (P/K) | $1.300 \times 10^{-2}$ rad · s²/m |
| oscillation angular frequency ($\omega_m$) | |
| angle mode (fixed oscillation frequency) | $6.283 \times 10^3$ rad/s |
| frequency mode (fixed oscillation amplitude) | $1.977 \times 10^4$ rad/s (25 $g_n$) |
| | $1.410 \times 10^4$ rad/s (0 $g_n$) |
| | $2.597 \times 10^3$ rad/s (−25 $g_n$) |
| oscillation amplitude | |
| angle mode (fixed oscillation frequency) | $3.147 \times 10^{-2}$ rad (25 $g_n$) |
| | $2.244 \times 10^{-2}$ rad (0 $g_n$) |
| | $4.134 \times 10^{-3}$ rad (−25 $g_n$) |
| frequency mode (fixed oscillation amplitude) | $1.000 \times 10^{-2}$ rad |

The sensing body scale factor is the tilt angle of the sensing body per unit acceleration. The symbol $g_n$ stands for the standard acceleration of gravity.

In implementing the oscillating version of the sensing body, certain simplifications are possible. Since the platform 25 (FIG. 7) does not continually rotate, the requirement for ball bearings 31 disappears. Furthermore, the measurement of the orientation angle of the sensing body 23 becomes much simpler since the sensing body no longer rotates with respect to the support structure 35.

Figure 14:
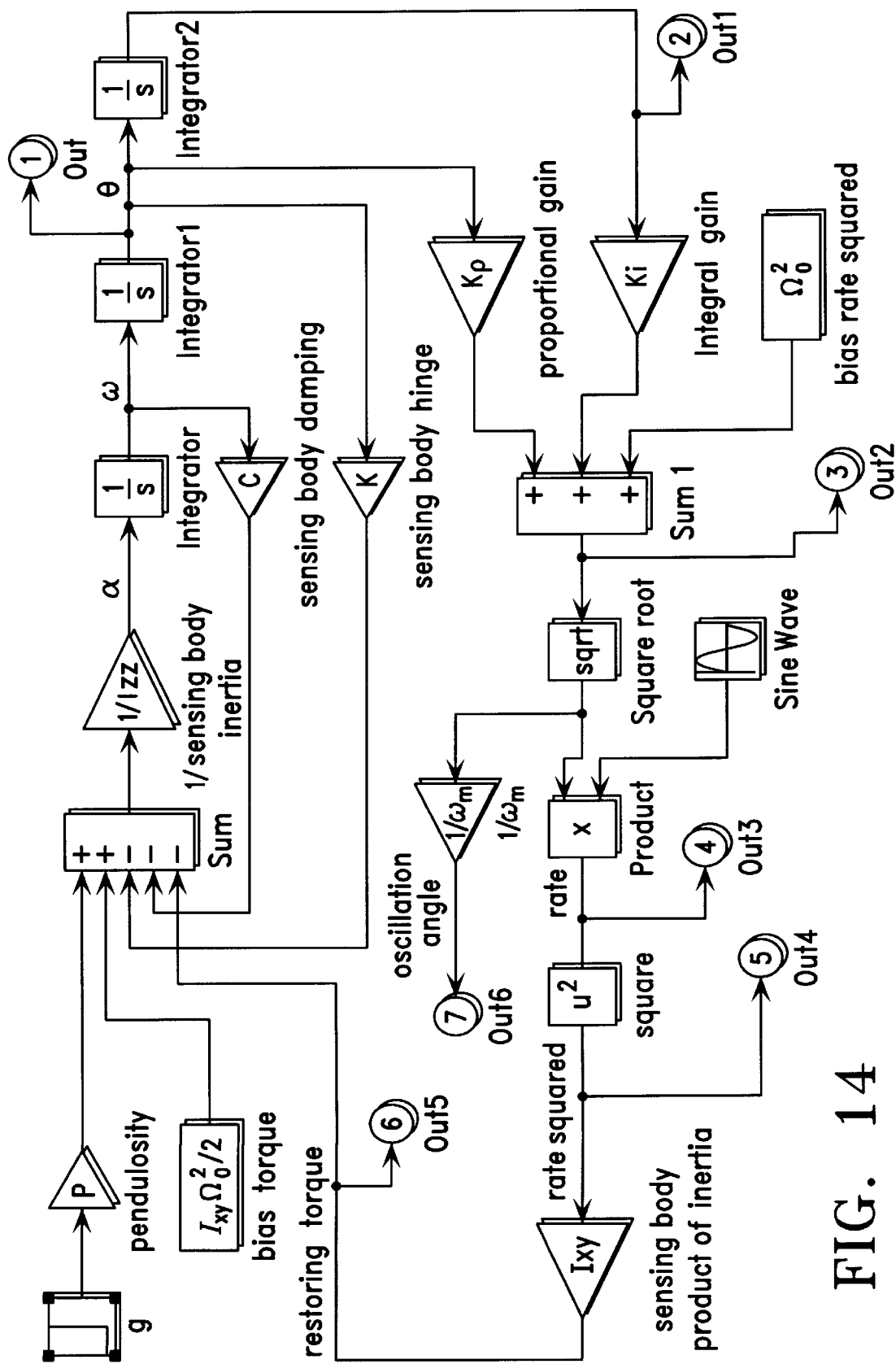
FIG. 14 shows a block diagram that mathematically defines the dynamics of the centripetal opposed pendulous accelerometer with an oscillating sensing body.

The dynamics of COPA having an oscillating sensing body is illustrated by the block diagram shown in FIG. 14.

What is claimed is:

1. A method for regulating the light intensity of a laser diode which illuminates a plurality of regions of a photodetector thereby causing photodetector regional currents to flow out of the photodetector, the method comprising the steps:

(a) combining the photdetector regional currents and scaling the result to obtain a scaled total photodetector current;

(b) generating a reference current;

(c) generating a difference current measure, the difference current measure being monotonically related to the difference of the scaled total photodetector current and the reference current;

(d) transforming the difference current measure into a control voltage;

(e) causing the current through the laser diode to vary monotonically with the control voltage.

2. The method of claim 1 wherein the transforming step (d) includes integrating the difference current measure.

3. The method of claim 1 further comprising the steps:

(f) enabling the performance of step (e) in response to a "start" command;

(g) inhibiting the performance of step (e) in response to a "stop" command.

4. The method of claim 3 wherein step (f) results in the laser diode current gradually increasing from a predetermined minimum value to a value determined by the control voltage over a time period of at least 100 microseconds.

5. The method of claim 1 further comprising the step:

(f) generating one or more regulated voltages, step (b) utilizing one of the one or more regulated voltages in generating the reference current.

6. The method of claim 1 further comprising the step:

(f) generating one or more regulated voltages, step (e) utilizing one of the one or more regulated voltages in driving the laser diode.

7. The method of claim 1 further comprising the steps:

(f) obtaining a measure of the laser diode current;

(g) generating a reference measure;

(h) stopping the passage of current through the laser diode if the measure of the laser diode current exceeds the reference measure.

8. A means for practicing the method of claim 1.

9. A plurality of interconnected circuits for regulating the light intensity of a laser diode which illuminates a plurality of regions of a photodetector thereby causing photodetector regional currents to flow out of the photodetector, the plurality of circuits comprising:

(a) a circuit for combining the photdetector regional currents and scaling the result to obtain a scaled total photodetector current;

(b) a circuit for generating a reference current;

(c) a circuit for generating a difference current measure, the difference current measure being monotonically related to the difference of the scaled total photodetector current and the reference current;

(d) a circuit for transforming the difference current measure into a control voltage;

(e) a circuit for causing the current through the laser diode to vary monotonically with the control voltage.

10. The plurality of circuits of claim 9 wherein circuit (d) includes a means for integrating the difference current measure.

11. The plurality of circuits of claim 9 further comprising:

(f) a circuit for enabling the operation of circuit (e) in response to a "start" command;

(g) a circuit for inhibiting the operation of circuit (e) in response to a "stop" command.

12. The plurality of circuits of claim 11 wherein the operation of circuit (f) results in the laser diode current gradually increasing from a predetermined minimum value to a value determined by the control voltage over a time period of at least 100 microseconds.

13. The plurality of circuits of claim 9 further comprising:

(f) a circuit for generating one or more regulated voltages, circuit (b) utilizing one of the one or more regulated voltages in generating the reference current.

14. The plurality of circuits of claim 9 further comprising:

(f) a circuit for generating one or more regulated voltages, circuit (e) utilizing one of the one or more regulated voltages in driving the laser diode.

15. The plurality of circuits of claim 9 further comprising:

(f) a circuit for obtaining a measure of the laser diode current;

(g) a circuit for generating a reference measure;

(h) a circuit for stopping the passage of current through the laser diode if the measure of the laser diode current exceeds the reference measure.

* * * * *